US012169537B2

(12) United States Patent
Shetty et al.

(10) Patent No.: US 12,169,537 B2
(45) Date of Patent: Dec. 17, 2024

(54) SCOPE-BASED ACCESS CONTROL SYSTEM AND METHOD (71) Applicant: Dell Products, L.P., Round Rock, TX (US)

(72) Inventors: Sudhir Vittal Shetty, Cedar Park, TX (US); Venkata Bala Koteswararao Donepudi, Round Rock, TX (US); Pushkala Iyer, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 337 days.

(21) Appl. No.: 17/491,643

(22) Filed: Oct. 1, 2021

(65) Prior Publication Data

US 2023/0109278 A1  Apr. 6, 2023

(51) Int. Cl.
G06F 21/31 (2013.01)
(52) U.S. Cl.
CPC .................................. G06F 21/31 (2013.01)
(58) Field of Classification Search
CPC ....................................................... G06F 21/31
See application file for complete search history.

(56) References Cited

U.S. PATENT DOCUMENTS

| | | | | |
|---|---|---|---|---|
| 7,315,985 | B1* | 1/2008 | Gauvin | H04L 41/12 715/764 |
| 7,752,665 | B1* | 7/2010 | Robertson | H04L 63/1458 726/22 |
| 10,951,604 | B1* | 3/2021 | Venkatasubramanian | H04L 67/02 |
| 2018/0218283 | A1* | 8/2018 | Jenson | G06Q 50/01 |
| 2018/0219889 | A1* | 8/2018 | Oliner | G06N 3/04 |
| 2018/0375791 | A1* | 12/2018 | Kaladgi | H04L 47/821 |
| 2019/0028496 | A1* | 1/2019 | Fenoglio | H04L 63/1425 |
| 2019/0042737 | A1* | 2/2019 | Krebs | H04L 63/1441 |
| 2019/0245843 | A1* | 8/2019 | Ja | G06F 21/41 |
| 2019/0273746 | A1* | 9/2019 | Coffing | G06Q 20/40 |
| 2019/0312857 | A1* | 10/2019 | Lander | H04L 9/3271 |
| 2019/0372962 | A1* | 12/2019 | Maria | G06F 21/41 |
| 2020/0007531 | A1* | 1/2020 | Koottayi | H04L 67/146 |
| 2020/0053091 | A1* | 2/2020 | Childress | H04L 63/08 |
| 2021/0019434 | A1* | 1/2021 | Bibliowicz | G06F 21/6218 |
| 2021/0042764 | A1* | 2/2021 | Rungta | H04L 63/083 |
| 2021/0266306 | A1* | 8/2021 | Furman | G06F 16/9566 |
| 2021/0286861 | A1* | 9/2021 | Churchill | G06F 21/31 |
| 2022/0131851 | A1* | 4/2022 | Singh | H04L 67/02 |
| 2022/0337590 | A1* | 10/2022 | Jaiswal | H04L 63/0815 |
| 2022/0391523 | A1* | 12/2022 | Kwong | G06F 21/6218 |

(Continued)

*Primary Examiner* — James R Turchen
(74) *Attorney, Agent, or Firm* — Fogarty LLP (57) ABSTRACT A scope-based access control system includes a systems manager that is executed to receive a request to perform an operation on one of multiple computing devices in which the request includes a session identifier associated with an established session of a user who issued the request. The systems manager forwards the request and the session identifier to a global authentication authority. The global authentication authority responds to the request by issuing a claim that specifies a computing device group that the session is authorized to access. The systems manager receives the claim specifying a computing device group from the global authentication authority. The systems manager then performs the operation based on whether the one computing device is included in the computing device group.

18 Claims, 5 Drawing Sheets

(56) References Cited

U.S. PATENT DOCUMENTS

2022/0417223 A1\* 12/2022 Prasad ................ H04L 63/0414
2023/0063214 A1\* 3/2023 Tischler .............. G06F 21/6227

\* cited by examiner

SCOPE-BASED ACCESS CONTROL SYSTEM AND METHOD

FIELD

This disclosure relates generally to Information Handling Systems (IHSs), and more specifically, to a scope-based access control system and method.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

Modern day computing resources are provided by large computing environments that may include server farms, computer clusters, individual computing devices, and/or data centers. Computing environments are generally associated with large organizations, such as business enterprises to educational institutions such as universities. In many cases, larger organizations may manage multiple server farms over a diverse geographical region. Nevertheless, management of such large, diversified computing environments are typically provided by remotely configured system management consoles. OpenManage Enterprise is one example of a system management console provided by Dell Technologies, which cost-effectively facilitates comprehensive lifecycle management for the computing devices of distributed computing environments from one console.

SUMMARY

According to one embodiment, a scope-based access control system includes a systems manager that is executed to receive a request to perform an operation on one of multiple computing devices in which the request includes a session identifier associated with an established session of a user who issued the request. The systems manager forwards the request and the session identifier to a global authentication authority. The global authentication authority responds to the request by issuing a claim that specifies a computing device group that the session is authorized to access. The systems manager receives the claim specifying a computing device group from the global authentication authority. The systems manager then performs the operation based on whether the one computing device is included in the computing device group.

According to another embodiment, a scope-based access control method includes the steps of receiving a request to perform an operation on one of multiple computing devices configured in a computing environment, and forwarding the request and the session identifier to a global authentication authority. The request includes a session identifier associated with an established session of a user who issued the request. The global authentication authority responds to the request by issuing a claim that specifies a computing device group that the session is authorized to access. The method further includes the steps of receiving the claim from the global authentication authority in which the claim specifies a computing device group that the session is authorized to access, and performing the operation based on whether the one computing device is included in the computing device group.

According to yet another embodiment, a computer program product includes a computer readable storage medium having program instructions that may be executed by a processor to receive a request to perform an operation on one of multiple computing devices in which the request includes a session identifier associated with an established session of a user who issued the request. The systems manager forwards the request and the session identifier to a global authentication authority. The global authentication authority responds to the request by issuing a claim that specifies a computing device group that the session is authorized to access. The systems manager receives the claim specifying a computing device group from the global authentication authority. The systems manager then performs the operation based on whether the one computing device is included in the computing device group.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments of the present disclosure provide a scope-based access control system and method that restricts access to the computing devices of a computing cluster (e.g., server farm, data center, etc.) based upon the user's role in a group. The scope-based access control system functions with an external global authentication authority, such as one conforming to an openiD Connect (OIDC) authentication protocol, to manage how those role-based rights are administered. Thus, multiple personnel having differing roles may manage the operation of a relatively large and diverse computing environment in an easy-to-use and efficient manner.

Management of a large, diversified computing environment is typically provided by a remotely configured system management console. Openmanage Enterprise is one example of a system management console provided by Dell Technologies, which cost-effectively facilitates comprehensive lifecycle management for the computing devices of distributed computing environments from one console. While such systems management consoles have been an effective tool for remotely managing computing devices, their use with relatively large numbers of computing devices can sometimes become unwieldy. For example, as ongoing software updates are made available, it would be beneficial to distribute those software updates as efficiently as possible. But in many cases, those software updates are purposed for a certain make and model of computing device. In other cases, it may be beneficial to provide those updates in only one or a few of all the locations where the computing devices (e.g., information handling systems) are disposed. It may also be beneficial to perform certain operations based on an organization (e.g., business, school, etc.) that each of the computing devices are licensed to, and/or an intended function of each of the computing devices (e.g., web server application, load balancer, RAID server, network management function, etc.).

In such cases, conventional systems management console implementations have not organized the computing devices it manages based on groups. Thus, these conventional implementations often do not perform well when managing computing environments having relatively large quantities of computing devices and in which those computing devices are configured in diverse locations relative to one another. Embodiments of the present disclosure provide a solution to this problem, among other problems, by providing a scope-based access management system in which authentication is provided by an external global authentication authority, such as an OIDC-based server, that enables role-based authentication for subsets of computing devices of a computing environment that are arranged in groups.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
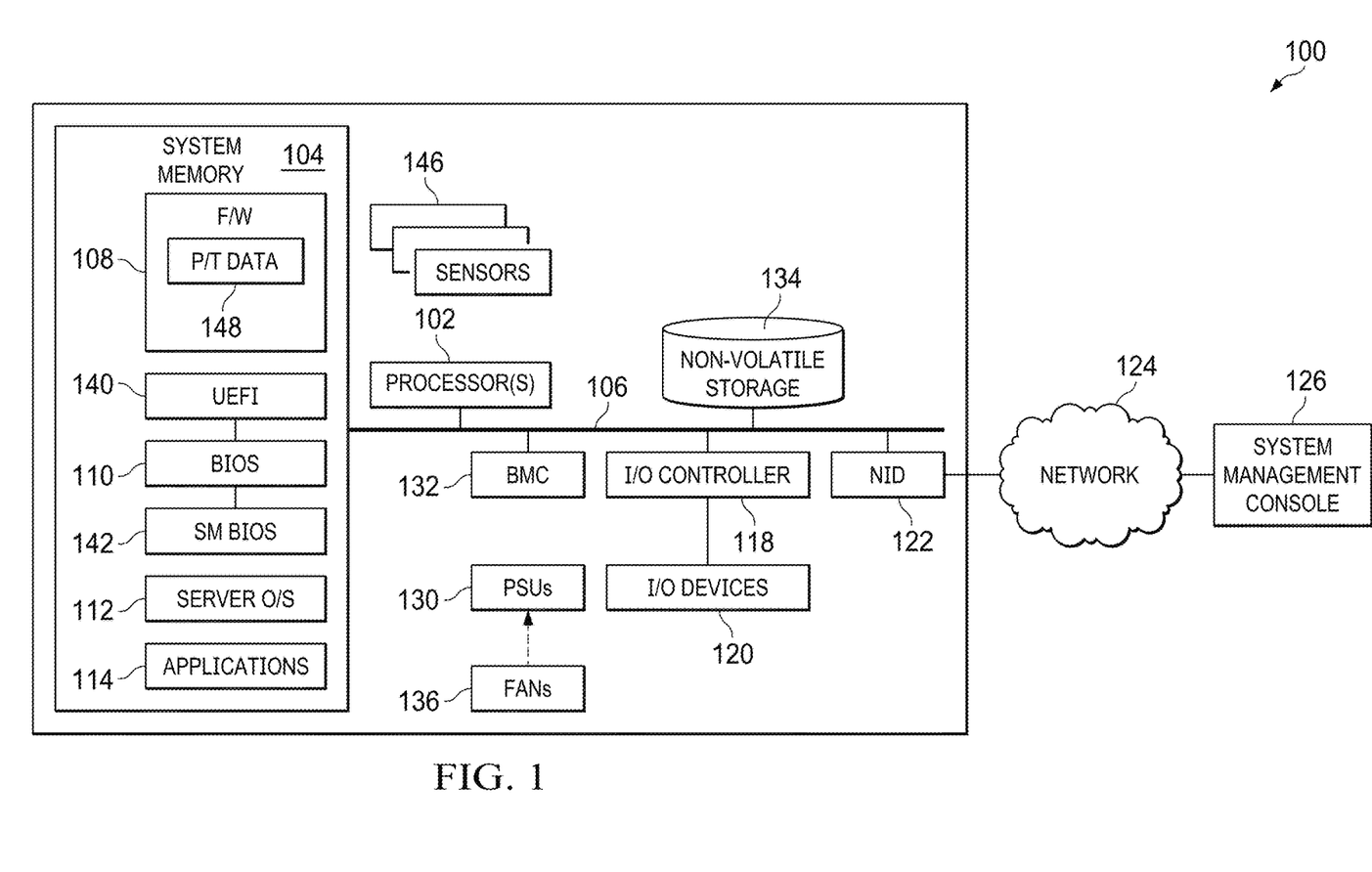
FIG. 1 is a block diagram of examples of components of an Information Handling System (IHS) that may be used to implement a scope-based access control system and method according to one embodiment of the present disclosure.

FIG. 1 is a block diagram of examples of components of an Information Handling System (IHS) that may be used to implement a scope-based access control system and method according to one embodiment of the present disclosure. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

For the purposes of this disclosure, the term "system management console" may refer broadly to systems that are configured to couple to a management controller and issue management instructions for an information handling system (e.g., computing device) that is being managed by the management controller. One example of such a system management console is the Dell OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
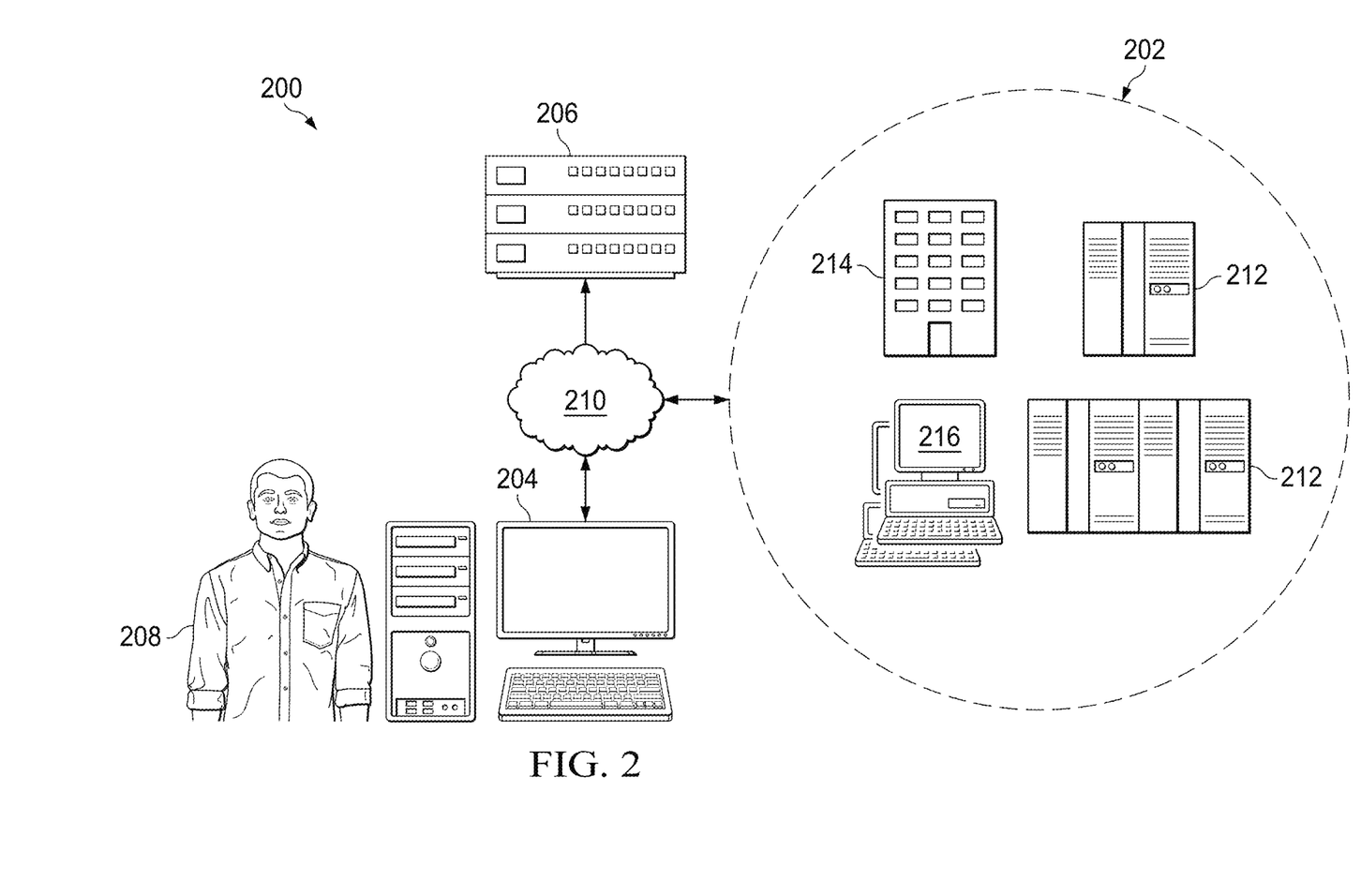
FIG. 2 illustrates an example scope-based access control system that may be implemented on a computing environment according to one embodiment of the present disclosure.

FIG. 2 illustrates an example scope-based access control system 200 that may be implemented on a computing environment according to one embodiment of the present disclosure. The scope-based access control system 200 generally includes a computing environment 202 that is managed by a systems management appliance 204. The scope-based access control system 200 also includes an external OIDC server 206 that is used to provide authentication services for a user 208 of the scope-based access control system 200. As shown, the systems management appliance 204 communicates with the computing environment 202 through a network 210. Nevertheless, it should be appreciated that the systems management appliance 204 may communicate locally with the computing environment 202, or form a part of the computing environment 202.

In general, the systems management appliance 204 is configured to monitor and control any number of computing devices in the computing environment. In one embodiment, the systems management appliance 204 provides at least a portion of the features of the systems management console 126 described herein above. The computing environment 202 may include any type and quantity of computing devices, such as those that may be included in a computing cluster 212, a data center 214, or multiple computing devices 216 of an organizational entity, such as a business, or school. In a particular example, computing environment 202 may be one managed by a single entity, such as a vendor of the computing devices, or some other large organization having a first computing cluster 212 located in Dallas, Texas, a second computing cluster 212 located in Houston, Texas, a data center 214 located in Atlanta, Georgia, and multiple computing devices 216 located in their home office in Austin, Texas Thus, the number and type of computing devices managed by the systems management appliance 204 can, and often does, vary widely across the computing environment that it is designed to manage.

It would be beneficial to utilize the authentication procedures provided by an external global authentication authority, such as that provided by an openID Connect (OIDC) authentication protocol. The OIDC authentication protocol builds on earlier authentication protocols (e.g., Oauth, openID, etc.) to verify a user's identity when attempting to access protected HTTP end points. The OIDC authentication protocol provides federated identity, which links a user's digital identity across separate security domains. In other words, when two applications are federated, a user can use one application by authenticating their identity with the other, without needing to create separate usernames/passwords for both. Thus, the OIDC server 206 may be uniquely suited for use with the systems management appliance 204 that administers the computing environment 202, which is dispersed over a relatively large geographical region. Although the present embodiment describes the use of a OIDC server 206 uses an OIDC-based authentication protocol, it should be appreciated that other global authentication authorities (e.g., Oauth, OpeniD Connect, SAML, and WS-Federation, etc.) may be implemented with the scope-based access control system 200 without departing from the spirit and scope of the present disclosure.

Figure 3:
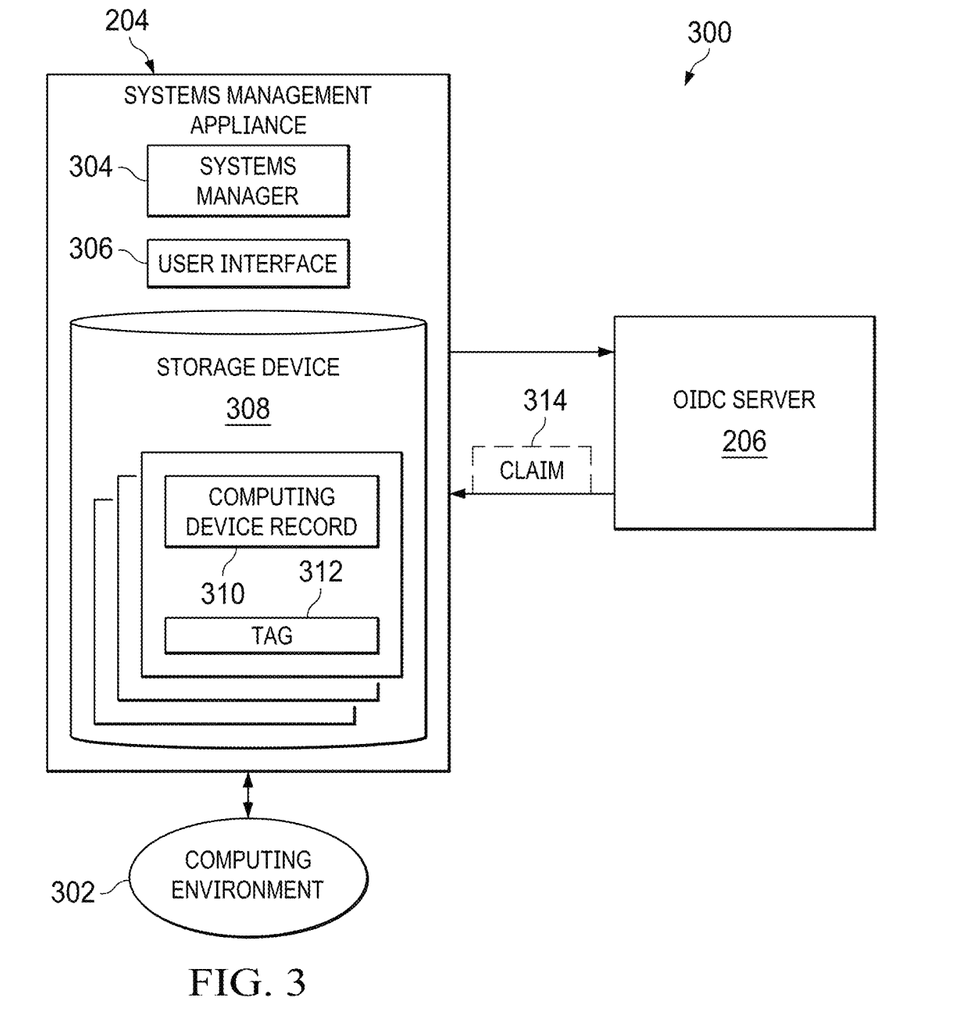
FIG. 3 is a diagram view illustrating several components of an example scope-based access control system according to one embodiment of the present disclosure.

FIG. 3 is a diagram view illustrating several components of an example scope-based access control system 300 according to one embodiment of the present disclosure. The scope-based access control system 300 includes a systems management appliance 204 installed with a systems manager 304, a user interface 306, and a storage device 308. In one embodiment, the user interface 306 provides at least a portion of the features of the systems management console 126 described herein above. The systems manager 304 monitors and controls the operation of various computing devices as described above with reference to FIG. 2. In one embodiment, systems manager 304 includes at least a portion of the Dell EMC OpenManage Enterprise (OME) that is installed on a secure virtual machine (VM), such as a VMWARE Workstation.

Storage device 308 stores computing device records 310 each associated with a computing device in the computing environment 302. Each computing device record 310 includes information about its associated computing device in the computing environment 302. Each computing device record 310 also stores a tag 312 indicating one or more groups that the computing device belongs to. For example, a tag 312 in one computing device record 310 may indicate that it belongs to a first group representing a first subset of computing devices licensed to a particular customer, and a second group representing a location where its associated computing device is located.

When a request is received from the user 208 to perform an operation on one or more computing devices, the systems manager 304, forwards the request and a session identifier to the OIDC server 206. The session identifier generally refers to information associated with a login session that has been previously established between the user 208 and the OIDC server 206. An operation generally refers to a command, when issued to a computing device, causes that computing device to perform some action, such as resetting the computing device, modifying the BIOS settings on the computing device, installing and/or removing an existing installation of an application on the computing device, and the lke. In response to the request, the OIDC server 206 responds by issuing a claim 314 that specifies one or more computing device groups that the session is authorized to access.

In one embodiment, the claim 314 is a JavaScript Object Notation (JSON) web token that is signed either using a private secret or a public/private key, and includes information associated with a role and a computing device group to be associated with the user. The OIDC server 206 would configure claims as 'dxcua' (e.g., DELL extended claim for user authentication) that contains the definition of scope associated with a user entity. An example claim format may be: 'dxcua: [{"Role":"DM", "user:G1,G2"}]' in which the user is assigned a role of device manager (DM) on groups G1 and G2. Another example claim format would be: 'dxcua: [{"Role":"DM","user":"G1,G2"},{"Role":"AD", "Entity":"G3,G4"}]' in which the user is assigned a device manager role on croups G1 and G2, and an administrator (AD) role on groups G3 and G4.

The systems manager 304 then compares the user's assigned role and groups with the computing devices to which the request is directed. The operation is performed on those computing devices that are included in the computing device group; otherwise, the operation is disallowed. Thus, the user can issue a request to perform an operation on a one or multiple computing devices according to the scope of their assigned roles. In one embodiment, the different roles may be administrator, device manager, and viewer. Whereas an administrator role is allowed global access to the computing device, a device manager role is allowed to perform configuration operations but is restricted from administrative functions, such as account setup, password setting, account registration, and the like. A viewer role is typically only allowed to receive configuration information from the computing device, and is restricted from modifying the computing device, Thus, an administrator role allows global access to a computing device, a device manager role allows a subset of the operations provided by the administrator role, while the viewer role only allows a subset of the operations provided by the device manager role.

Figure 4:
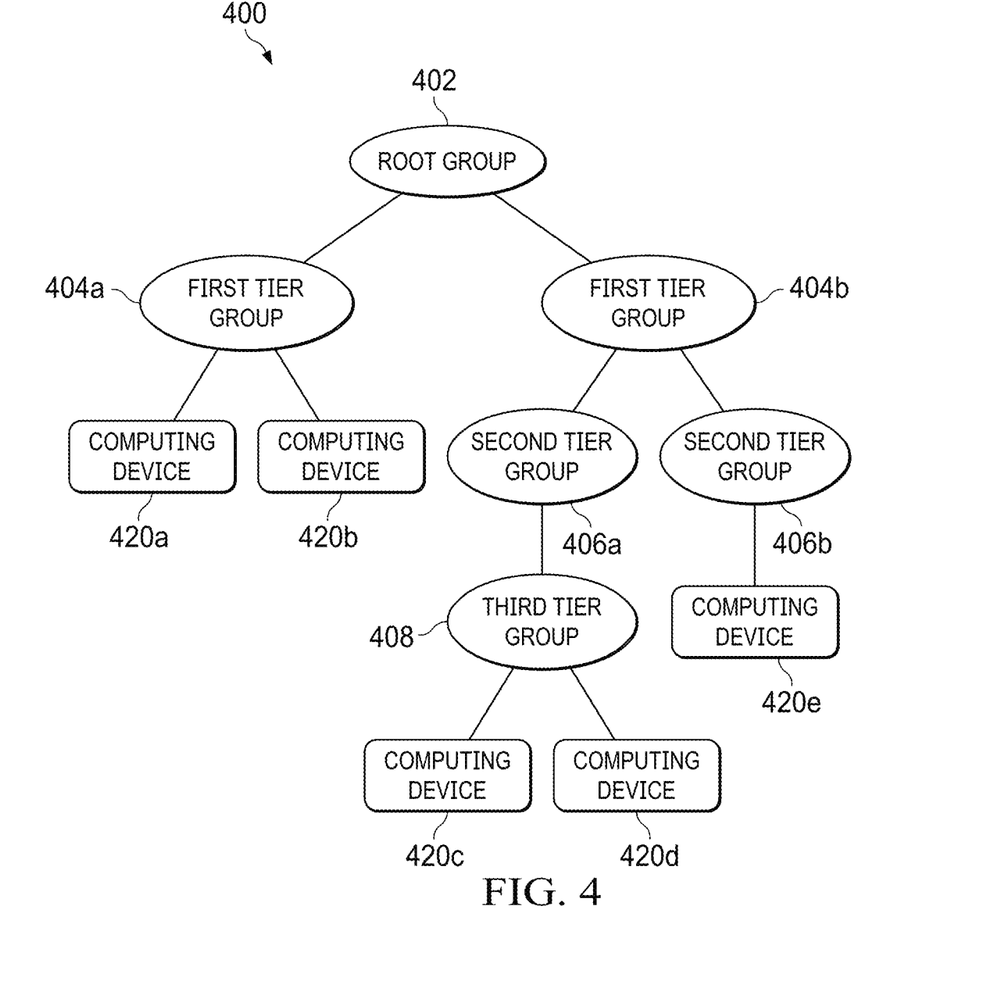
FIG. 4 illustrates an example computing device group structure that the computing devices of the computing environment may be arranged in according to one embodiment of the present disclosure.

FIG. 4 illustrates an example computing device group structure 400 that the computing devices of the computing environment 302 may be arranged in according to one embodiment of the present disclosure. The structure 400 includes a root group 402 along with multiple hierarchically arranged groups including two first tier groups 404a, 404b, two second tier groups 406a, 406b, and one third tier group 408. Additionally, two computing devices 420a, 420b are arranged in the first tier group 404a, two computing devices 420c, 420d are arranged in the third tier group 408, and one computing device 420e is arranged in the second tier group 406b.

The hierarchical arrangement of the structure 400 provides a technique for grouping computing devices with a greater level of granularity than provided by conventional structuring of computing devices by a systems manager. For example, the first tier group 404b may be allocated to a national region (e.g., United States), the second tier group 406a may be allocated according to a particular sub-region (e.g., Texas) of the first tier group 404b, while the third tier group 408 may be allocated to a particular sub-region (e.g., Austin) of the second tier group 406a. Thus, if a request to perform an operation is issued against the third tier group 408, that request would be directed to the computing devices 420c, 420d arranged in the third tier group 408. However, if a request to perform an operation is issued against the first tier group 404b, that request would be directed to the computing devices 420c, 420d arranged in the third tier group 408 and the computing device 420e arranged in the second tier group 406b because it has first tier group 404b as its ancestor.

The example above describes the hierarchical structure 400 arranged according to a hierarchy of geographical regions. Nevertheless, it should be appreciated that the structure may be arranged according to any suitable hierarchical structure. For example, the structure 400 may be arranged according to a device type of each of the computing devices. Examples of device types may include a form factor (e.g., laptop, desktop workstation, tablet, etc.), make/model of computing device (e.g., Dell Optiplex 7085, Inspiron 2500, etc.), and the like. Other example structures may be arranged according to an entity that each of the computing devices are licensed to, or an intended function (web server, storage engine, virtualized network function, etc.) of each of the computing devices.

It may be important to note that the structure 400 may include a hierarchical structure arranged according to different criteria. For example, while the first tier group 404b is arranged according to a geographical location, the other first tier group 404a may be arranged according to a type of each computing device. Because the structure 400 may include a hierarchical structure arranged according to different criteria, a single computing device can be a member of more than one group.

Figure 5:
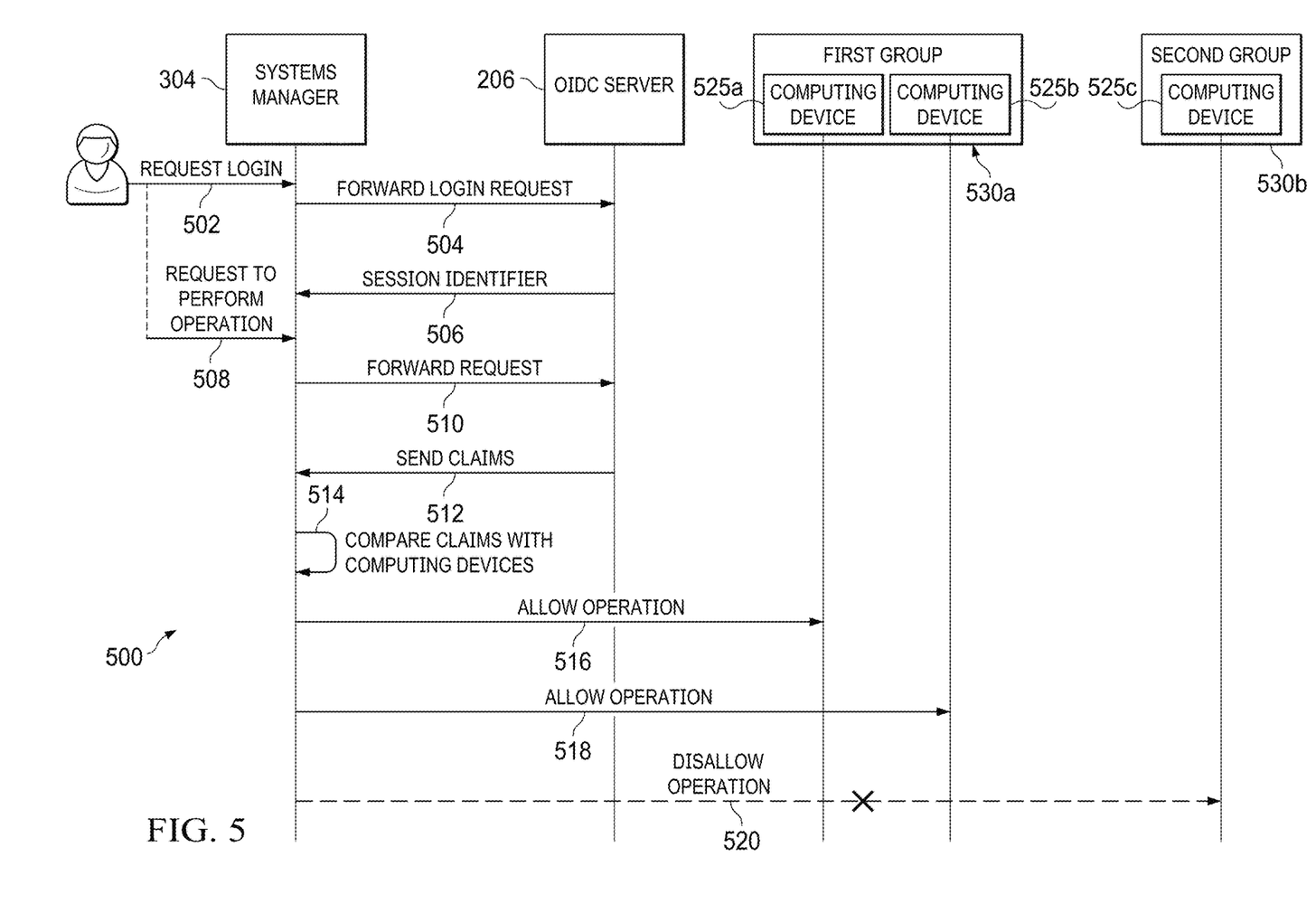
FIG. 5 is a workflow diagram describing certain steps of one embodiment of a scope-based access control system method using the systems manager according to one embodiment of the present disclosure.

FIG. 5 is a workflow diagram describing certain steps of one embodiment of a scope-based access control system method 500 using the systems manager 304 according to one embodiment of the present disclosure. As will be described in detail herein below, the method 500 is adapted to request a claim 314 from the OIDC server 206 each time a request to perform an operation is issue by the user 208. In other embodiments, the method 500 is adapted to request a claim 314 from the OIDC server 206 when a login session is established with the OIDC server 206 such that the systems manager 304 may store the claims for filtering all subsequent requests based on the roles and groups allotted to that user. Additionally, the method 500 includes a first, second, and third computing devices 525a, 525b, and 525c, respectively. While first and second computing devices 525a and 525b are arranged in a first group 530a, third computing device 525c is arranged in a second group 530b.

Initially at step 502, the user issues a request to establish a login session with the systems manager 304. Thereafter at step 504, the systems manager 304 forwards the request to the OIDC server 206, which in turn responds by establishing a login session with the user 208 by sending a session identifier to the systems manager 304 at step 506. In one embodiment, the established login session is a single sign on (SSO) session.

Steps 508-520 generally describe how the scope-based access control system provides scope-based filtering for requests to perform operations based upon the user's role and the group(s) that the computing devices are arranged in. At step 508, the user issues a request to perform an operation. Thereafter at step 510, the systems manager 304 forwards the request along with the previously received session identifier to the OIDC server 206. In response, the OIDC server 206, at step 512, sends one or more claims based upon the session identifier to the systems manager 304. In one embodiment, the claims are packaged in a JWT token that stores an encrypted version of the claims.

When the claims are received, the systems manager 304 then compares the claims against the role(s) of the user 208 and those computing device groups that may be associated with those roles at step 514. For example, the claims may include a device manager role for the first group 530a, and a viewer role for the second group 530b. Additionally, the requested operation is a configuration command that is assigned to have a device manager type role. As such, the OIDC server 206 allows the operation to be performed on the first and second computing devices 525a, 525b at step 516 and 518 because the claims assert that the user has device manager rights for the computing devices in the first group 530a. The OIDC server 206, however, disallows the operation from being performed on the third computing device 525c at step 520 because the user only has viewer role access rights for the third computing device 525c arranged in the second group 530b.

Steps 508-520 may be repeatedly performed for each request issued by the user 208 for performing an operation on one or more computing devices in the computing environment 302. Nevertheless, when use of the scope-based access control system method 500 is no longer needed or desired, the process ends.

Although FIG. 5 describes an example method that may be performed for providing scope-based access rights to a systems manager 304 in a computing environment 302, the features of the method 500 may be embodied in other specific forms without deviating from the spirit and scope of the present disclosure. For example, the method 500 may perform additional, fewer, or different operations than those described in the present examples. As another example, the claims associated with the user may be sent to the systems manager 304 when the login session is established (e.g., step 506), and stored (e.g., storage 308) so that ensuing requests for performing operations retrieve the claims from its storage rather than from an external OIDC server 206.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A scope-based access control system comprising:
a plurality of computing devices of a computing cluster;
a systems manager configured to monitor and control the operation of the plurality of computing devices, the systems manager stored in at least one memory and executed by at least one processor to:
receive a request to perform an operation on one of the computing devices, the request including a session identifier associated with an established session of a user who issued the request;
forward the request and the session identifier to a global authentication authority, wherein the global authentication authority responds to the request by issuing a claim that specifies a computing device group that the session is authorized to access, the computing device group comprising a subset of the computing devices;
receive the claim from the global authentication authority, wherein the claim specifies a computing device group that the session is authorized to access, wherein the computing device group comprises one of a plurality of computing device groups that are arranged in a hierarchy of computing device groups according to at least one of a location of each of the computing devices, a device type of each of the computing devices, or an entity that each of the computing devices are licensed to;
when a first computing device is included in the computing device group, perform the operation on the first computing device; and
when the first computing device is not included in the computing device group, disallow the operation on the first computing device.

2. The scope-based access control system of claim 1, wherein the global authentication authority comprises an openID Connect authentication authority and the session identifier comprises a JWT token.

3. The scope-based access control system of claim 1, wherein the systems manager is further executed to arrange the hierarchy of computing device groups according to an intended function of each of the computing devices.

4. The scope-based access control system of claim 1, wherein the systems manager is further executed to determine whether the first computing device is included in the computing device group by:
associating a role with the computing device group;
search for a record of the first computing device from among a plurality of records associated with each of the plurality of computing devices;
determine if the record is included in the computing device group; and
determine if the computing device group including the record is tagged with a role value similar to the role value included in the claim received from the global authentication authority.

5. The scope-based access control system of claim 4, wherein the systems manager is further executed to determine whether a plurality of the first computing devices are included in any one of the plurality of the computing device groups.

6. The scope-based access control system of claim 4, wherein a plurality of representations associated with each of the plurality of computing devices are stored in a database of the systems manager.

7. The scope-based access control system of claim 6, wherein the systems manager is further executed to generate the plurality of representations associated with each of the plurality of computing devices using a discovery process.

8. A scope-based access control method comprising:
receiving, using a systems manager that is configured to monitor and control the operation of a plurality of computing devices, a request to perform an operation on one of the computing devices, the request including a session identifier associated with an established session of a user who issued the request;
forwarding, using the systems manager, the request and the session identifier to a global authentication authority, wherein the global authentication authority responds to the request by issuing a claim that specifies a computing device group that the session is authorized to access, the computing device group comprising a subset of the computing devices;
receiving, using the systems manager, the claim from the global authentication authority, wherein the claim specifies a computing device group that the session is authorized to access, wherein the computing device group comprises one of a plurality of computing device groups that are arranged in a hierarchy of computing device groups according to at least one of a location of each of the computing devices, a device type of each of the computing devices, or an entity that each of the computing devices are licensed to;
when the first computing device is included in the computing device group, performing, using the systems manager, the operation on the first computing device; and
when the first computing device is not included in the computing device group, disallowing, using the systems manager, the operation on the first computing device.

9. The scope-based access control method of claim 8, further comprising arranging the hierarchy of computing device groups according to at least one of an intended function of each of the computing devices.

10. The scope-based access control method of claim 8, further comprising determining whether the first computing device is included in the computing device group by:
associating a role with the computing device group;
searching for a record of the first computing device from among a plurality of records associated with each of the plurality of computing devices;
determining if the record is included in the computing device group; and
determining if the computing device group including the record is tagged with a role value similar to the role value included in the claim received from the global authentication authority.

11. The scope-based access control method of claim 10, further comprising determining whether a plurality of the first computing devices are included in any one of the plurality of the computing device groups.

12. The scope-based access control method of claim 10, further comprising storing a plurality of representations associated with each of the plurality of computing devices in a database of the systems manager.

13. A computer program product comprising a non-transitory computer readable storage medium having program instructions embodied therewith, the program instructions executable by a processor to cause the processor to perform a method comprising:
receive, using a systems manager that is configured to monitor and control the operation of a plurality of computing devices, a request to perform an operation on one of the computing devices, the request including a session identifier associated with an established session of a user who issued the request;
forward, using the systems manager, the request and the session identifier to a global authentication authority, wherein the global authentication authority responds to the request by issuing a claim that specifies a computing device group that the session is authorized to access, the computing device group comprising a subset of the computing devices;
receive, using the systems manager, the claim from the global authentication authority, wherein the claim specifies a computing device group that the session is authorized to access, wherein the computing device group comprises one of a plurality of computing device groups that are arranged in a hierarchy of computing device groups according to at least one of a location of each of the computing devices, a device type of each of the computing devices, or an entity that each of the computing devices are licensed to;
when the first computing device is included in the computing device group, perform, using the systems manager, the operation on the first computing device; and
when the first computing device is not included in the computing device group, disallow, using the systems manager, the operation on the first computing device.

14. The computer program product of claim 13, wherein the global authentication authority comprises an openID Connect authentication authority and the session identifier comprises a JWT token.

15. The computer program product of claim 13, wherein the systems manager is further executed to arrange the hierarchy of computing device groups according to at least one of an intended function of each of the computing devices.

16. The computer program product of claim 13, wherein the systems manager is further executed to determine whether the first computing device is included in the computing device group by:
associating a role with the computing device group;
search for a record of the first computing device from among a plurality of records associated with each of the plurality of computing devices;
determine if the record is included in the computing device group; and
determine if the computing device group including the record is tagged with a role value similar to the role value included in the claim received from the global authentication authority.

17. The computer program product of claim 16, wherein the systems manager is further executed to determine whether the plurality of the first computing devices are included in any one of the plurality of the computing device groups.

18. The computer program product of claim 13, wherein the systems manager is further executed to generate a plurality of representations associated with each of the plurality of computing devices using a discovery process.

\* \* \* \* \*